US006272816B1

(12) United States Patent
Viaud et al.

(10) Patent No.: US 6,272,816 B1
(45) Date of Patent: Aug. 14, 2001

(54) LARGE WRAPPING NET ROLL PRESSURE ARM ASSEMBLY SERVING ALSO AS A LOADING PLATFORM

(75) Inventors: Jean Viaud, Gray (FR); Henry Dennis Anstey; Kenneth Craig Phillips, both of Ottumwa, IA (US); Nissim Mass, Haemek (IL); Yuval Lieber, Megido (IL); Zvi Paz, Haemek (IL)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/439,935

(22) Filed: Nov. 12, 1999

(51) Int. Cl.[7] ....................................................... B65B 11/56
(52) U.S. Cl. .............................. 53/587; 53/118; 53/389.2; 53/211; 242/441.4; 242/564.4
(58) Field of Search ........................... 53/118, 211, 389.1, 53/389.2, 389.3, 587; 242/312, 337, 441.4, 564.5, 564.4

(56) References Cited

U.S. PATENT DOCUMENTS

| 5,181,368 | * | 1/1993 | Anstey et al. | 53/587 |
| 5,319,899 | * | 6/1994 | Jennings et al. | 53/118 |
| 5,433,059 | * | 7/1995 | Kluver et al. | 53/399 |
| 5,687,548 | * | 11/1997 | McClure et al. | 53/399 |
| 5,692,365 | * | 12/1997 | Meyer et al. | 53/587 |
| 5,729,953 | * | 3/1998 | Fell et al. | 53/118 |
| 5,822,967 | * | 10/1998 | Hood et al. | 56/341 |
| 5,974,764 | * | 11/1999 | Anstey et al. | 53/118 |
| 5,979,141 | * | 11/1999 | Phillips | 53/389.2 |

* cited by examiner

Primary Examiner—Peter Vo
Assistant Examiner—Thanh Truong

(57) ABSTRACT

An apparatus for wrapping net about bales formed in the baling chamber of a large round baler is arranged such that the net material supply roll is pressed directly against the driven wrap material feed roll by a pressure roll carried by a pair of transversely spaced lower arm portions of a lower arm section of a vertically swingable pressure arm assembly that also includes a separate, upper arm section. The force pressing the pressure roll against the supply roll originates with gas springs coupled to a linkage that is in turn coupled to transversely spaced upper arm portions of the upper arm section, these arm portions carrying respective force transfer rollers that engage respective intermediate sections of the lower arm portions. Associated with each lower arm portion is an inverted L-shaped bracket having a short leg pivotally mounted between the axis of the pressure roller and one end of a guide link which cooperates with the short bracket leg and the lower arm portion to form a four-bar linkage which acts to properly position retainer rolls, respectively mounted to the end of the long leg of each of the inverted L-shaped brackets, adjacent the periphery of the supply roll so as to prevent the supply roll from moving away from its desired location on the drive wrap material feed roll. The lower pair of arm portions are shaped for cradling a new roll of wrapping material when lowered to a loading position from which they may be raised to move the supply roll in engagement with the driven net feed roll. A guide structure is provided which cooperates with bale forming belts for conveying the wrapping material, once fed through the feed rolls, beneath the bale discharge gate and through the inlet of the baling chamber.

19 Claims, 3 Drawing Sheets

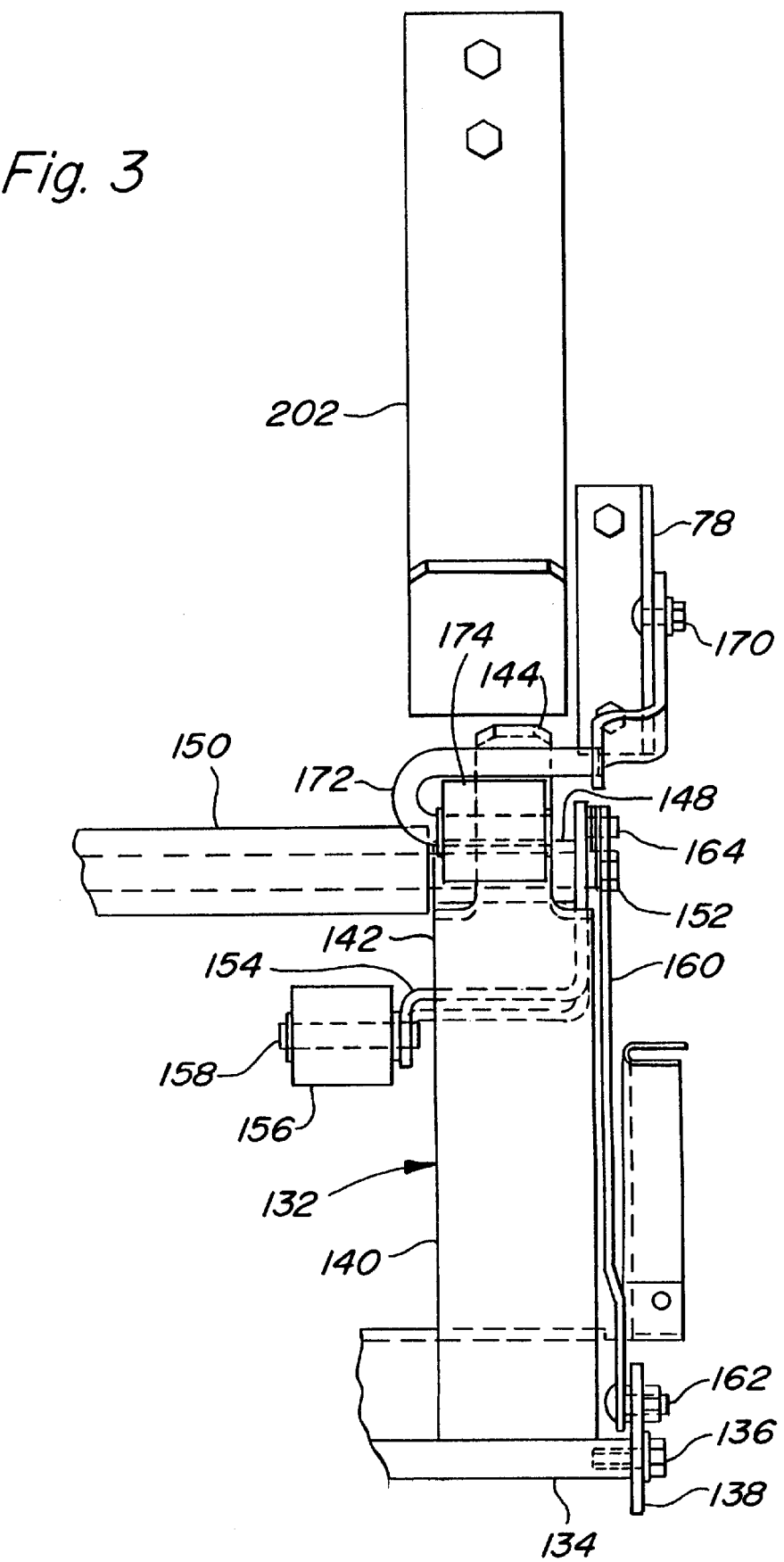

LARGE WRAPPING NET ROLL PRESSURE ARM ASSEMBLY SERVING ALSO AS A LOADING PLATFORM

BACKGROUND OF THE INVENTION

The present invention relates to net wrapping devices for large round balers and more specifically relates to arms for applying pressure to such rolls so as to resist the pulling off of net from the roll during the wrapping process and thereby tension the wrap material. U.S. Pat. No. 5,974,764 issued Nov. 2, 1999 to Anstey et al. discloses a large round baler net wrapping apparatus including a gas cylinder arranged for applying a force to a pressure arm including a pressure roll engaging a supply roll of surface wrap material in order to hold it tightly against one of a pair of wrap material feed rolls operable for feeding wrap material for delivery to the baling chamber of a large round baler for wrapping a bale located there. This application further discloses a small idler roll mounted close to the one feed roll in order to increase the surface area of the feed roll in contact with the net so that the pull exerted on the net by a bale being wrapped would not induce excessive slippage of the net and thereby aid in stretching the net the amount desired for tight wrapping.

However, the small idler roll has the disadvantage that, during the loading of a new roll of wrap material for being dispensed by the wrapping mechanism, it is somewhat difficult for one person to thread the free end the new roll of wrap material about the idler roll and then into the nip of the feed rolls. While the total amount of resistance to unrolling can be increased by having the pressure arm disposed for forcing the wrap material roll against the front wall of the housing containing the roll of wrap material, this action is not desirable since it is difficult to control the resistance due to changing moisture and other environmental conditions. Furthermore, although the geometrical relationship between the known pressure arm and the wrap material roll can be designed to increase the pressure exerted by the roll of material on the upper feed roll to an extent which would make it possible to eliminate the small idler roll, this arrangement is not entirely satisfactory since it results in the pressure roller being located in an upper zone of the wrap material. Then, because of various factors including dust, belt tolerances, pulley surfaces, etc, one can expect an occasional abrupt start of the v-belt drive of the upper net feed roll which can cause the roll of net material to shift rearward, out of position for proper feeding. While one solution would be to move the pressure roll to engage a more rearward zone of the supply roll, this would increase the frictional engagement of the supply roll with the front wall of the wrapping mechanism while decreasing the force pressing the supply roll against the feed roll, both changes being undesirable as it makes the control of net stretch less precise.

SUMMARY OF THE INVENTION

According to the present invention, there is provided an improved net wrapping apparatus for wrapping bales formed in a large round baler, and more specifically, there is provided an improved pressure arm assembly for urging the wrap material supply roll against the wrap material feed roll.

A broad object of the invention is to provide a net wrapping apparatus of the type discussed above, but which does not require a small idler roll for effecting additional contact between the driven feed roll and the wrapping material supply roll for increasing the resistance of the wrapping material to being pulled off the supply roll during wrapping a bale.

Another broad object of the invention is to provide a net wrapping apparatus of the type discussed above, but which includes a supply roll retaining roll assembly which prevents the supply roll from be shifted from a desired location on the upper net material feed roll during start up of the feed roll drive.

A more specific object is to provide a wrapping apparatus, as set forth in the previous objects, which includes a pressure-applying arm assembly that operates to urge the roll of net material into contact with the driven feed roll with an increasing force as the weight of the net material roll decreases during usage so as to provide sufficient force to prevent significant slippage between the supply roll and the upper feed roll.

Still another object of the invention is to provide a pressure-applying arm assembly, as defined in the immediately preceding object, wherein a lower portion of the arm assembly serves also as a loading platform for cradling a new roll of wrap material while the free end of the roll is being manually inserted into the nip of the feed rolls.

A more specific object of the invention is to provide a lower pressure-applying arm assembly, as stated in the immediately preceding object, wherein the lower portion of the arm assembly includes a four-bar linkage including a link carrying pressure-applying and restraining rolls which are kept in a desired orientation throughout the movement of the lower arm portion as the supply roll of net is used.

These and other objects of the invention will become apparent from a reading of the ensuing description together with the appended drawings.

BRIEF DESCRIPTION OF THE DRAWINGS

FIG. 3 is a rear view of the right-hand side of the pressure arm and spare roll support assemblies.

DESCRIPTION OF THE PREFERRED EMBODIMENT

Preliminarily, it is to be noted that various components may be described as existing in pairs while only one of each pair is shown and it is to be understood that the absent component is the same as, or similar in construction to, the one shown. Further, the terms "right-hand" and "left-hand" are made with reference to the view point of an observer standing behind and facing in the forward direction of travel of the implement being described.

Figure 1:
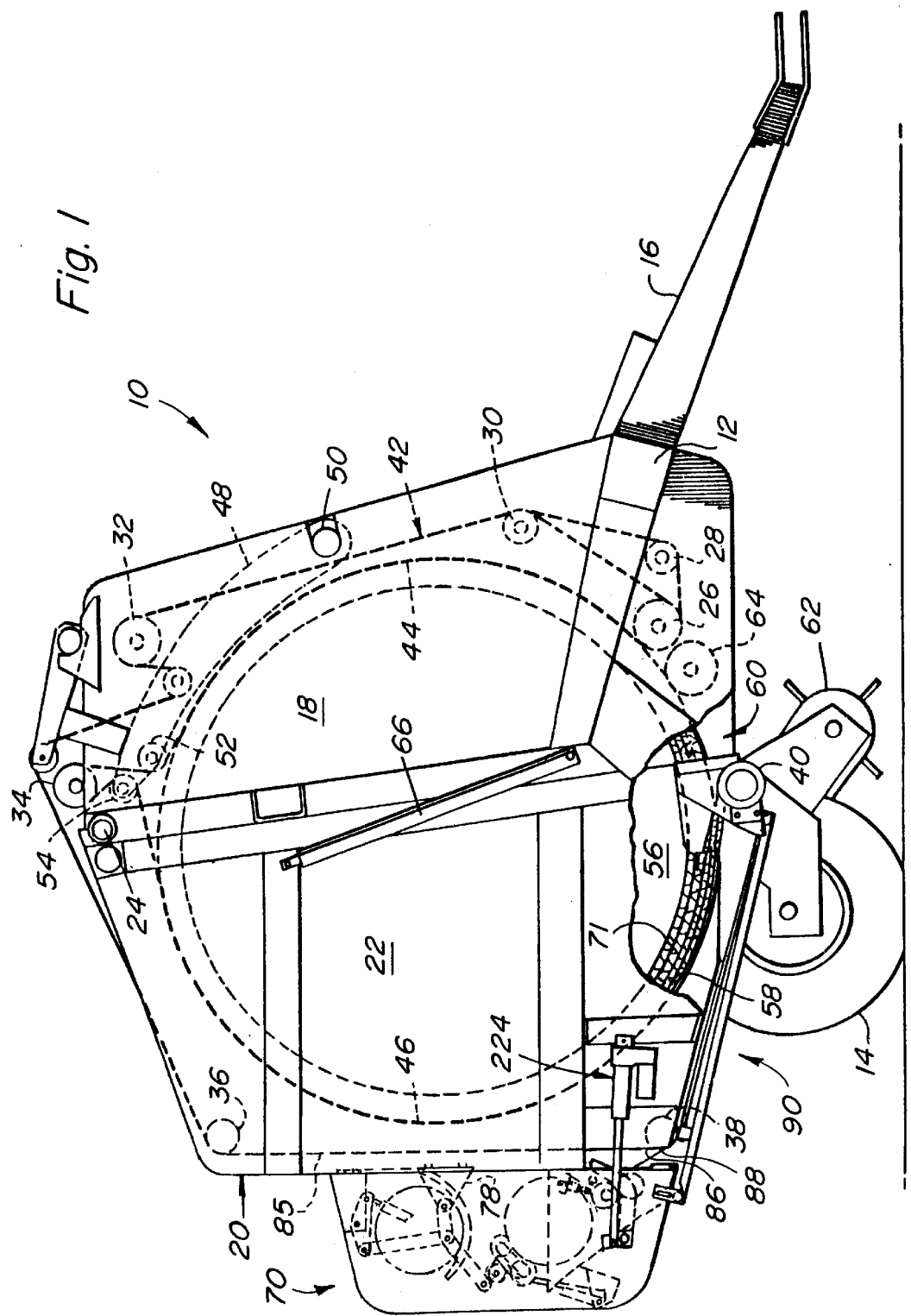
FIG. 1 is a right side elevational view of a large round baler equipped with a net wrapping assembly incorporating a pressure arm mechanism constructed in accordance with the present invention.

Referring now to FIG. 1, there is shown a baler 10 of the type for making large cylindrical bales and commonly called a large round baler. The baler 10 comprises a main frame 12 supported on a pair of ground wheels 14. The frame 12 has a draft tongue 16 secured thereto and adapted for being connected for towing by a prime mover such as an agricultural tractor, not shown. A pair of transversely spaced, vertical side walls 18 are joined to the frame 12 and have respective upright rear ends. A bale discharge gate 20, including opposite side walls 22, is vertically pivotally attached, as at 24, to upper rear locations of the side walls 18, the side walls 22 having upright forward ends which abut the rearward ends of the side walls 18 when the gate 20 is in a lowered closed position, as shown.

Arranged about the periphery of, and extending between the side walls 18 and 22, are a plurality of bale-forming belt support rolls having their opposite ends rotatably supported in bearings, not shown, carried by the side walls. Specifically, beginning at a lower central location of, and proceeding counterclockwise to an upper rear location of the side walls 18, there are mounted a driven roll 26, a lower front roll 28, an intermediate front roll 30, an upper front roll 32, and an upper rear roll 34. Continuing counterclockwise from an upper rear location of the gate side walls 22, there is mounted an upper rear roll 36, a lower rear roll 38 and a lower front roll 40. Located between the pairs of side walls 18 and 22 and supported in side-by-side relationship to one another across the various belt support rolls are a plurality of endless bale-forming belts 42. Except for some of the belts 42 which skip the lower front roll 28, the belts 42 are trained so that they serially engage the rolls 26, 28, 30, 32, 36, 38, 40 and 34. A front run 44 of the belts 42 extends upwardly from the driven roll 26 to the roll 34. Similarly, a rear run 46 of the belts 42 extends upwardly from the lower front gate roll 40 to the roll 34. Mounted between rear end locations of a pair of rearwardly extending tensioning arms 48, which are vertically pivotally mounted, as at 50, to a mid-height location at the front of the side walls 18, are closely spaced, front and rear idler rolls 52 and 54, with the belt runs 44 and 46 cooperating with the side walls 18 and 22 to define an expansible baling or bale-forming chamber 56, closed at its top by the idler rolls 52 and 54, and here shown in a state of considerable expansion and containing a bale 58. When the chamber 56 is empty, the front and rear belt runs 44 and 46, respectively, converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54, the chamber 56 thus being wedge-shaped as viewed from the side. The bottom of the chamber 56 is provided with a crop inlet 60 extending between the driven roll 26 and the lower front gate roll 40. Crop products are introduced into the inlet 60 by a pickup 62 for being rolled into a bale, such as the bale 58, by the action of the front and rear belt runs 44 and 46, which are respectively driven so as to travel toward and away from the inlet, and initially also by a starter roll 64 rotatably mounted in the side walls 18 adjacent to, and being driven in the same direction as, the driven roll 26 so that it operates to strip crop being carried downwardly by the front run of belts 44. As the bale 58 is being formed, the chamber 56 yieldably expands, to a predetermined size as shown, against the force established in the belts by a tensioning system including the pair of tensioning arms 48 together with a pair of tensioning springs (not shown) and a pair of hydraulic cylinders (not shown) coupled between the walls 18 and the arms 48 for resisting upward movement of the arms, in a manner well known in the art. A pair of gate cylinders 66 are provided for swinging the gate 20 upwardly, about the pivotal attachment 24, to an open position when it is desired to discharge the bale 58 onto the ground.

Figure 2:
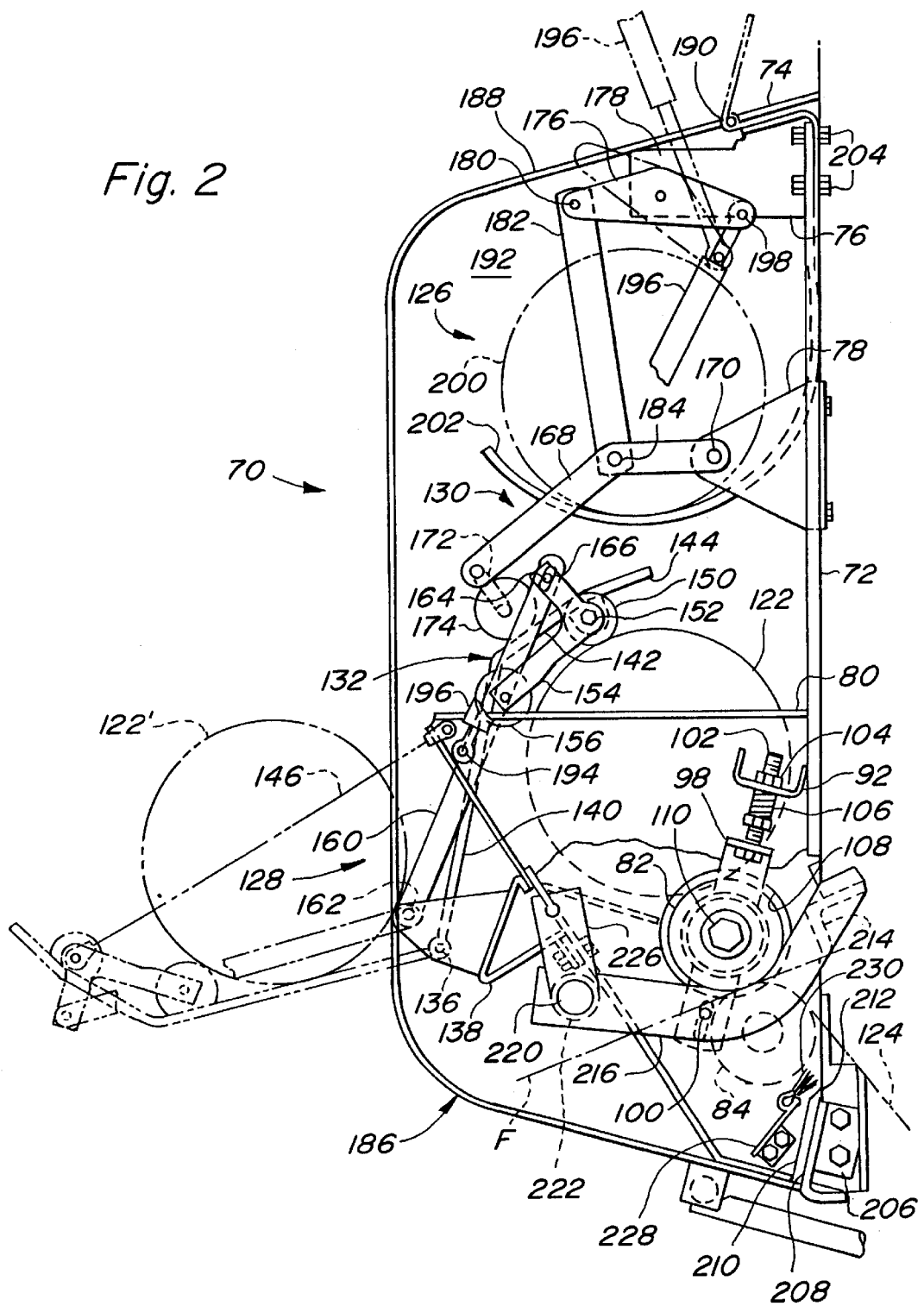
FIG. 2 is a right side elevational view of a rear portion of the net wrapping assembly of FIG. 1, with parts broken away, and showing the pressure arm mechanism in solid lines in a pressure applying position and in broken lines in a wrapping material roll loading position.

Referring now also to FIG. 2, a web wrap material dispensing apparatus 70 is shown mounted to a lower rear location of the discharge gate 20 for wrapping bales, such as the bale 58, formed in the baling chamber 56 prior to the bales being discharged onto the ground. It is to be noted that the apparatus 70 is designed for dispensing a web of net material having a width greater than the width of the baling chamber 56 for being fed into the baling chamber 56 in a such way, not discussed in detail, that the net material becomes wrapped over the end corners of the bale 58, as shown at 71 in FIG. 1. Specifically, the apparatus 70 includes a support structure, mounted to the rear, bottom half of the gate 20, comprising a vertical panel 72 extending transversely across, and being fixed to, vertical flanges respectively defining rear ends of the opposite side walls 22 of the gate. The panel 72 has an upper end which is defined by a downwardly and rearwardly extending flange 74. Bolted to upper right- and left-hand areas of the panel 72 beneath the flange 74 are respective transverse legs of a pair of angular, crank arm support brackets 76. Spaced vertically below the pair of support brackets 76 and having transverse legs bolted to the panel 72 are a pair of angular, biasing arm support brackets 78. The support structure of the wrapping apparatus 70 further includes a pair of longitudinally extending, vertical support walls 80, which are approximately right-triangular in side view and have forward, vertical sides defined by transverse flanges that overlap a lower portion of the panel 72 and are secured, as by threaded fasteners, not shown, to structure at the rear of the gate 20 so as to be spaced transversely from each other by a distance greater than the distance between the gate side walls 22, i.e., greater than the width of the baling chamber 56.

Extending between and having their opposite ends rotatably mounted in bearings carried by the support walls 80 are upper and lower wrap material feed rolls 82 and 84, respectively, with the rotational axis of the roll 82 being disposed above and rearwardly of the axis of the roll 84 such that a planar wrap material flight path F is disposed tangentially to the rolls at their bite or nip, and extends upwardly and forwardly from the nip and below the panel 72. Referring back to FIG. 1, it will be appreciated that the material flight path F intersects a vertical run 85 of the belts 42 extending between the upper and lower support rolls 36 and 38, respectively, at a location above a nip or bite 86 defined by a net material guide pan portion 88, forming part of a wrap material guide assembly 90, and a portion of the belts 42 engaged with the lower rear support roll 38.

The upper net feed roll 82 is preferably constructed of a metal core covered with a high-friction rubber. The roll 82 is mounted so as to be biased against the lower net feed roll 84 so that the latter is driven by frictional engagement with the former. Specifically, welded to the outer surface of each of the walls 80 is a transversely extending unshaped bracket 92. Located below, and having an out-turned upper end disposed parallel to, each of the brackets 92 is a quill mounting strap 98 containing an elongated slot in which is received a guide pin or bolt 100 which is fixed to the adjacent wall 80. A pair of bolts 102 respectively project upwardly through the pair of out-turned ends of the quill mounting straps 98 and through the adjacent bracket 92, and each are held in an adjusted position by a nut 104 received on a threaded upper end thereof. A coil spring 106 is located on each bolt 102 and is loaded between the associated bracket 92 and quill mounting strap 98. Projecting through a central location along the length of each of the straps 98 and through a circular clearance opening 108 provided in the adjacent wall 80, is a feed roll mounting bolt 110 that serves to rotatably mount the feed roll 82 to a quill carried by the strap 98, with movement of the roll toward and away from the lower roll 84 being permitted by the respective slots in the lower portions of the straps 98. Not shown is a selectively engageable belt and pulley drive arrangement by which the upper feed roll 82 is caused to be driven by rotation of the lower rear bale-forming belt support roll 38.

An active net material supply roll 122 is shown positioned directly in contact with the driven upper feed roll 82. A length of net material 124 extends from a lower forward location of the supply roll 122 about the rearward half of the upper feed roll 82 and then through the nip or bite of the feed rolls 82 and 84. In FIG. 2, the length of net material 124 continues on from the feed rolls 82 and 84, and is positioned as it would be when a bale is being wrapped, i.e., it engages a portion of an upper forward quadrant of the lower feed roll 84 and extends into the nip 86 defined by the bale forming belts 42 and the pan 88 of the material guide assembly 90.

Referring now also to FIG. 3, there is shown a pressure arm assembly 126 for applying a near constant force to the active net material supply roll 122 for urging it against the upper feed roll 82 so as to establish a desired frictional resistance to the force tending to pull the net from the roll during wrapping of a bale. Specifically, the arm assembly 126 includes separate lower and upper arm sections 128 and 130, respectively. The lower arm section 128 includes a pair of transversely spaced lower arm portions 132 having first ends welded to a transverse rod 134, the arm portions being mounted for swinging vertically about a horizontal transverse pivot axis defined by respective pins 136 coupling opposite ends of the rod 134 to respective brackets 138 fixed to the rear sides of the support walls 80 at a height which is approximately that of the axis of rotation of the upper net feed roll 82. The arm portions 132 are constructed from formed straps or narrow plates which, with respect to the rod 134, include a major straight inner segment 140, an intermediate segment 142 forming an included angle of about 138° with the straight segment 140, and a relatively short end segment 144 making an included angle of about 165° with the intermediate segment 142. Thus, when the arm portions 132 are rotated to a rearwardly extending loading position with the straight segments 140 approximately horizontal, a cradle is formed for holding a new roll of wrap material 122', as shown in broken lines in FIG. 2. With the wrap material roll 122' in its loading position, a length of wrapping material 124 may be easily pulled off the roll and manually fed through the nip of the feed rolls 82 and 84, in a manner described below. It is here noted that extending between the upper rear corner of each support wall 80 and the associated arm portion 132 is a flexible support member 146, here shown as a cable but which may be any suitable flexible member, such as a chain, for example, the support members 146 becoming taut to offer support to the lower arm portions 132 when the latter are in their lowered loading position.

Welded to each arm portion 132, in the vicinity of the junction of the intermediate and outer arm segments 142 and 144, is a tubular sleeve 148 (FIG. 3). A pressure roller 150 extends between and is mounted for rotation within the sleeves 148 by respective bearing assemblies including mounting bolts 152, it being noted that the bolts 152 also serve as an attaching point for a respective one of the flexible elements 146. The pressure roller 150 engages the periphery of the supply roll 122 at a location approximately diametrically opposite from the zone of contact of the roll 122 with the upper net wrap feed roll 82.

Each pivot bolt 152 also serves to pivotally mount a containment roll bracket 154. Each bracket 154, as viewed from the side when the arm portion 132 is generally upright, has an inverted L-shape, with the short leg of the L being oriented upwardly and rearwardly from, and with the long leg of the L being oriented downwardly and rearwardly from, the pivot bolt 152. The brackets 154 respectively have inwardly offset lower portions which extend beneath a respective one of the arm portions 132 and terminate at a down-turned end to which a containment or retainer roll 156 is mounted by an inwardly projecting pin 158. The roll 156 is located so as to be in engagement with, or at least in close proximity to, the wrap material supply roll 122 as the arm portions 132 pivot downwardly as the roll 122 is used so that the latter is kept from being propelled from its desired location in engagement with the upper feed roll 82 during initial engagement of the drive to the feed roll 82. Associated with each containment roll 156 for the purpose of making sure that the roll 156 remains in a proper attitude for containing the wrap material supply roll 122, is a guide link 160, which cooperates with associated ones of the arm portions 132 and brackets 154 to form a four-bar linkage. Specifically, each guide link 160 has one end coupled, as at bolt 162, to a respective one of the brackets 138, and has another end coupled, as at pin 164, to the short leg of a respective one of the brackets 154. In order to permit the brackets 154 to undergo some lost-motion so as not to interfere with the supply roll 122 as its diameter becomes relatively small as the roll approaches depletion during usage, the guide link 160 is provided with an elongate hole or slot 166 which receives the pin 164. It can be seen that the pivots defined at the bolts 136 and 162 are approximately parallel to, and spaced apart approximately the same distance as, the pivots defined at the bolts 152 and pins 164, and therefore the four-bar linkage is close to being a parallel linkage so that the brackets 154 remain approximately in the same disposition as the linkage pivots between the opposite extremes of its movement corresponding to when there is a whole wrap material roll 122 and when the roll 122 is substantially depleted.

The upper arm section 130 comprises a pair of transversely spaced upper arm portions 168 respectively vertically pivotally mounted to the pair of brackets 78, as at bolts 170. A J-shaped rod 172 has the end of its stem welded to an inner surface at the free end of each arm portion 168 and rotatably mounted on each of the hook-forming parts of the J is a force-applying roller 174, the rollers 174 respectively being in contact with the intermediate arm segments 142 of the lower arm portions 132 when the arm assembly 126 is in a working condition, as shown in solid lines in FIG. 2. The geometry of the lower and upper arm sections 128 and 130, respectively, is such that, as the weight of the active supply roll 122 diminishes, the force urging the roll 122 against the feed roll 82 increases in an amount which results in the force at the interface of the supply roll 122 and feed roll 82 remaining substantially constant, thereby maintaining a substantially constant tension in the wrap material 124 as it is being wrapped about a bale located in the baling chamber. Thus, the pressure arm assembly 126 acts to provide sufficient force for preventing significant slippage between the supply roll 122 and the feed roll 82.

A lever and linkage assembly forms part of a force mechanism for urging the arm portions 168 downwardly so that the rollers 174 are forced downwardly against the lower arm segments 142. Specifically, a fore-and-aft extending lever 176 is pivotally coupled, as by a pin 178 located about half way between opposite ends of the lever, to each bracket 76. Coupled to the rear end of each lever 176, as by a pin 180, is the upper end of a force transfer link 182 having its lower end coupled, as by a pin 184, to the adjacent upper arm portion 168 at a location spaced from the pin 170 approximately one third of the distance between the pin 170 and the roller 174. A housing or cover 186 has a top wall 188 hinged, as at 190 to a transverse part of each bracket 76, which is disposed parallel to the back-turned upper end 74 of the panel 72. The cover 186 has opposite side walls 192, and coupled, as by a pin 194, to the inside of each side wall 192 at a location beside the upper rear corner of the adjacent support wall 80, as considered when the cover is in its closed position, as shown in solid lines in FIG. 2, is the cylinder end of a gas cylinder 196 having its rod end pivotally coupled, as at a pin 198, to the forward end of the adjacent lever 176. When the cover 186 is in its closed position, the gas cylinders 196 exert a force tending to keep the cover 186 in its closed position and at the same time act to produce a force which is transferred by the levers 176 and links 182 to the upper arm portions 168, resulting in the rollers 174 acting through the arm portions 132 to force the rollers 150 against the wrap material roll 122. When the cover 186 is manually raised to its open position, the cylinders 196 will act to keep the cover in its open position and at the same time will act to hold the upper arm portions 168 raised out of the way so as to permit the lower arm section 128 to be lowered to its loading position, if desired. A wrap material spare roll 200 is supported by a spare roll support assembly comprising a pair of transversely spaced, J-shaped roll supports 202 formed of straps having their upper ends respectively bolted, as at 204, to the pair of brackets 76.

Fixed to a lower rear location of the discharge gate 20 just below and forwardly of the lower net feed roll 84 is an angular knife support bracket 206 that defines a near vertical knife mounting surface 208 that extends transversely between the support walls 80. Mounted to the surface 208 is a cut-off knife 210 having a beveled upper end forming a cutting edge 212. An anvil 214 is constructed from a length of angle iron and extends in parallel relationship to the cutting edge 212 and forms part of a cut-off arm assembly for being selectively moved from a stand-by position wherein it is elevated above the cutting edge 212, as shown in FIG. 2, to a cut-off position wherein one of the angle member legs engages the beveled surface leading up to the cutting edge 212. Specifically, the cut-off arm assembly includes right- and left-hand, fore-and-aft extending, transversely spaced arms 216 having forward ends joined together by the anvil 214. The arms 216 are joined at their rear ends by a rock shaft 220 that is received for pivoting in a pair of cylindrical sleeves forming respective parts of a pair of mounting structures 222 respectively fixed to rear sides of the support walls 80. As can be seen in FIG. 1, an electrically driven, reversible linear actuator 224 is mounted to the right-hand side wall 22 of the discharge gate 20 and has an output shaft coupled to a crank arm 226 fixed to the outer end of the rock shaft 220. The output shaft of the actuator 224 is in an extended condition when the anvil 214 is in its raised standby position. After a bale is wrapped with net, in a manner to be described, the actuator 224 is caused to contract its output shaft. This causes the arm assembly 216, 220, 226 to be swung clockwise, as viewed in FIG. 2, resulting in the anvil 214 moving to its lowered cut-off position, and along the way engaging the length of net 124 and bringing it down into contact with the knife cutting edge 212 where it is cut off.

Located between the lower wrap material feed roll 84 and the knife edge 212 is a brush 228 having a bristles 230 extending coextensive with, and positioned adjacent to, the feed roll 84 and the beveled surface of the knife 210 leading to the cutting edge 212. The brush 228 performs two functions. One is to act as a stripper which prevents the length of net 124 from wrapping about the roll 84 at the beginning of the wrapping cycle, and the other is to act to entangle the length of net 124 as the latter is being cut off by the action of the anvil 214 working against the knife 210.

The purpose of entangling the length of net 124 is so that, as the wrapping cycle begins, it will become folded back on itself resulting in a double layer of net being carried to the nip 86 before the entangled end is pulled loose. This fold at the leading end of the length of wrap material 124 presents an edge free of dangling strands prone to becoming wrapped about spreading devices carried by the rolls 38 and 40.

The pressure arm assembly 126 of the present invention operates in the following manner. When the cover 186 of the web wrap dispensing apparatus 70 is closed, as shown in solid lines in FIG. 2, the lower arm section 128 will be in an operative position with the pressure roll 150 engaged with an upper rear quadrant of the active wrapping material supply roll 122. The upper arm section 130 will be in its lowered position with the rolls 174 respectively in engagement with the intermediate sections 142 of the lower arm portions 132. The gas cylinders 196 will then be acting to exert a biasing time acting through the crank arms 176 and links 182 to urge the upper arm portions 168 downwardly so that the rolls 174 press against the lower arm portions 132. The force imposed by the rolls 174 on the arm portions 132 results in the pressure roll 150 being urged against the upper rear quadrant of the wrap material supply roll 122, with the latter thus being forced into engagement with the driven wrap material feed roll 82. As material is used from the supply roll 122, its diameter will decrease with the result that the lower arm portions 132 will, as viewed in FIG. 2, pivot clockwise and the upper arm portions 168 will follow along and pivot counterclockwise. The geometrical relationship between the arm sections 128 and 130 and the force transfer links 182 are such that as wrapping material is used from the supply roll 122, the loss of weight due to this usage is compensated for by an increasing force being exerted by the pressure roll 150, this action ensuring that the resistance to material being pulled off the roll 122 will remain substantially constant so that the desired stretching of the wrap material is kept substantially constant. The force exerted on the supply roll 122 is sufficient to prevent any substantial slippage from occurring between the supply roll 122 and the driven feed roll 82.

All the while the lower arm portions 132 are pivoting clockwise during usage of the wrap material from the supply roll 122, the guide links 160 and short legs of the brackets 154 will act together with the lower arm portions 132 as a four-bar linkage which maintains the retainer rolls 156 positioned in close proximity to, or at most in light engagement with, a peripheral location of the supply roll 122, which is spaced downwardly and rearwardly from the pressure roller 150, such that the containment rolls 156 are always favorably located for preventing the wrap material supply roll 122 from being moved off its desired location on the driven feed roll 82 upon initial engagement of the drive for the feed roll 82.

What is claimed is:

1. In a wrapping mechanism for feeding a web of wrapping material into a baling chamber of a large round baler for wrapping a bale located in the chamber, the mechanism including upper and lower wrap material feed rolls having their surfaces frictionally engaged with each other and adapted for being counter-rotated, a wrapping material active supply roll located in direct contact with said upper feed roll so as to be rotated in response to rotation of said upper feed roll, with the supply roll having opposite first and second peripheral locations respectively adjacent and remote from said baling chamber, a roll pressure applying arm assembly including a transverse pressure roller engaged with a peripheral segment of said supply roll extending between said second peripheral location and a top of said supply roll, the arm assembly further including an energy source for urging the roller against said supply roll thereby urging the latter against a desired peripheral zone of said upper feed roll, and a length of wrap material extending from said supply roll through a nip defined by said upper and lower feed rolls, the improvement comprising: said arm assembly including separate upper and lower arm sections; said upper arm section including a pair of transversely spaced upper arm portions being pivotally mounted at first ends for movement about a first transverse axis, located above said supply roll and adjacent said baling chamber, between a raised loading position and a lowered working position; said lower arm section including a pair of transversely spaced lower arm portions pivotally mounted at first ends for movement about a second transverse axis, located on an opposite side of said supply roll from said baling chamber, between a raised working position and a lowered loading position; said pressure roller extending between and being mounted to said pair of lower arm portions; and said upper and lower arm sections overlapping each other at a location adjacent said peripheral portion of said supply roll when said upper and lower arm sections are in their respective working positions; and said upper arm section being in engagement with said lower arm section for imparting the force urging said pressure roller against said active supply roll.

2. The wrapping mechanism defined in claim 1 wherein the geometry of said lower and upper arm sections is such that the amount of force exerted on said active supply roll increases as the weight of the active supply roll decreases such as to provide sufficient force to prevent significant slippage between said active supply roll and said upper feed roll.

3. The wrapping mechanism defined in claim 1 wherein said lower arm section supports a containment element which is located on an opposite side of said active supply roll from said baling chamber so as keep the active supply roll from moving away from engagement with said desired peripheral zone of said upper feed roll during operation.

4. The wrapping mechanism defined in claim 1 wherein said lower arm portions of said lower arm section are at a level commensurate with the pivotal connections of the first ends of the lower arm portions when the lower arm section is in its lowered loading position extending away from said baling chamber; and a support device for holding each of said lower arm portions in said loading position, whereby the lower arm portions are oriented for supporting a new wrap material supply roll prior to the latter being lifted into place in engagement with the upper feed roll.

5. The wrapping mechanism defined in claim 4 wherein said pair of lower arm portions are shaped so as to define a cradle for said new roll of wrap material when the lower arm section is in its lowered loading position.

6. The wrapping mechanism defined in claim 1 wherein said upper pair of arm portions each have a pressure transfer element at a free end thereof; and said lower pair of arm portions each have a flat surface located in the vicinity of said pressure roller, with each pressure transfer element being in engagement with a respective one of the flat surfaces when said arm sections are in respective working positions.

7. The wrapping mechanism defined in claim 6 wherein each pressure transfer element is in the form of a pressure transfer roller.

8. The wrapping mechanism defined in claim 1 wherein said pair of lower arm portions each have a supply roll containment element mounted thereto at a location spaced toward said second axis from said pressure roller, the containment elements being positioned for engaging said second side of said supply roll for limiting movement of the supply roll in a direction away from said baling chamber.

9. The wrapping mechanism defined in claim 8 wherein each supply roll containment element is a containment roller.

10. The wrapping mechanism defined in claim 1 wherein said upper pair of arm portions each have a pressure transfer element at a free end thereof; said pair of lower arm portions each include at least first and second arm segments joined together to define an included angle; said first arm segments having an end remote from said second arm segment and at said second transverse axis; said pressure roller extending between and being rotatably mounted to said second arm segments; and said second arm segments including respective surfaces located so as to be engaged by the respective pressure transfer elements carried by said upper pair of arm portions when the upper and lower arm sections are in their respective working positions.

11. The wrapping mechanism defined in claim 10 wherein said pair of second arm segments each have a supply roll containment element mounted thereto and spaced toward said second axis from said pressure roller which automatically positions the containment elements at least in close proximity to said second peripheral location of the wrap supply roll for limiting movement of the supply roll away from the baling chamber.

12. The wrapping mechanism defined in claim 11 wherein each pressure transfer element is a pressure transfer roller and each supply roll containment element is a containment roller.

13. The wrapping mechanism defined in claim 11 wherein said lower pair of arm portions are each a formed strap which is shaped for cradling a supply roll of wrap material when the lower arm section is in its loading position, whereby a new wrap material supply roll may be rested on the first pair of arm segments prior to being loaded into its dispensing position in engagement with the upper feed roll.

14. In a large round baler web wrap dispensing mechanism including a pair of transversely spaced support structures, a pair of upper and lower wrap material feed rolls extending between and being rotatably mounted to said pair of support structures, with the upper one of said feed rolls defining a lower boundary of a zone adapted for containing a roll of wrapping material extending lengthwise along, and having a lower peripheral portion engaged with, said upper feed roll, a pressure arm assembly including a pair of transversely spaced arms having respective first ends mounted for pivoting about a horizontal transverse axis spaced vertically above a location adjacent a first side of said zone and having respective second ends to which is connected a pressure-applying member, the improvement comprising: said pressure arm assembly including separate upper and lower arm sections with said pair of arms being a pair of upper arms forming part of said upper arm section; said lower arm section including a pair of transversely spaced lower arms having first ends mounted for pivoting about a second horizontal transverse axis located below, and spaced to an opposite side of, said zone from said first mentioned horizontal transverse axis; a pressure roller extending between and being rotatably mounted to said pair of lower arms at respective locations spaced from said first ends such that said pressure roller is disposed to engage an upper portion of a roll of wrap material located in said zone and to thereby define an upper boundary of said zone when the second arm section is in a raised working position; said upper arm section being located for overlapping and engaging said lower arm section when the former is in a lowered working position and the latter is in said raised working position; and a force applying mechanism being coupled to said upper arm section for forcing it downwardly against said lower arm section with the latter thereby being adapted for forcing an active roll of wrap material located in said zone against said upper feed roll.

15. The web wrap dispensing mechanism defined in claim 14 wherein said pair of lower arms respectively include a pair of straps forming a loading surface which faces upwardly, when the lower arm section is in a lowered loading position, so as to be positioned for receiving and holding a new roll of wrap material being loaded into the mechanism; and an arm support member connected between the support structures and said pair of lower arms for selectively retaining the latter in said loading position.

16. The web wrap dispensing mechanism defined in claim 14 wherein said lower and upper arm sections are so located and arranged relative to each other and to said upper boundary of said zone that the arm sections are adapted for increasing the force applied to said active roll of wrapping material as the latter is used during wrapping operation such as to compensate for the loss of weight of the active roll of wrapping material to thereby establish a near constant resistance to the unrolling of wrapping material from said active roll of wrapping material.

17. The web wrap dispensing mechanism defined in claim 14 wherein said lower arm section carries a containment device which, when the lower arm section is in said raised working position, is located below said pressure roller in a position for engaging said active roll of wrapping material located in said zone so as to prevent said active roll of wrapping material from moving away from said upper feed roll.

18. The web wrap dispensing mechanism defined in claim 14 wherein a guide link is mounted in general parallel relationship to each of said pair of lower arms; a containment element support bracket being pivotally mounted between each guide link and an adjacent one of said pair of lower arms, with said containment element support bracket thus cooperating with its associated lower arm and guide link to form a four-bar linkage; each containment element support bracket having an extension located adjacent a segment of said zone; and a containment element being mounted to a lower end of each bracket extension.

19. The web wrap dispensing mechanism defined in claim 18 wherein each containment element support bracket is mounted to an associated one of the pair of lower arms by a pivot bolt which also serves to rotatably support one end of the pressure roller.

* * * * *